United States Patent [19]

Mollere et al.

[11] Patent Number: 4,657,559
[45] Date of Patent: Apr. 14, 1987

[54] PROCESS FOR SEED CRYSTAL PREPARATION FOR PHOSPHORIC ACID CRYSTALLIZATION

[75] Inventors: Phillip D. Mollere; Vivian C. Astley, both of New Orleans; Jody J. Taravella, Harvey, all of La.

[73] Assignee: 501 Freeport Research and Engineering Company, New Orleans, La.

[21] Appl. No.: 731,969

[22] Filed: May 8, 1985

[51] Int. Cl.⁴ .............................................. B01D 9/02
[52] U.S. Cl. ...................................... 23/297; 23/299; 23/301; 423/321 R; 62/532
[58] Field of Search ................... 23/295 R, 296, 297, 23/299–301; 423/316, 317, 321 R; 62/532, 536

[56] References Cited

U.S. PATENT DOCUMENTS

| | | |
|---|---|---|
| 1,283,398 | 10/1918 | Carothers et al. |
| 2,813,777 | 11/1957 | Swensen ........................ 23/301 R |
| 2,847,285 | 8/1958 | Pahud |
| 2,857,246 | 10/1958 | Malowan |
| 3,284,171 | 11/1966 | Harper |
| 3,333,929 | 8/1967 | Mazurek et al. |
| 3,642,439 | 2/1972 | Moore et al. |
| 3,679,374 | 7/1972 | Kovacs |
| 3,853,486 | 12/1974 | Heymer et al. |
| 3,890,097 | 6/1975 | Minor |
| 3,912,803 | 10/1975 | Williams et al. |
| 3,947,499 | 3/1976 | Edwards et al. |
| 4,083,934 | 4/1978 | Lowe et al. |
| 4,215,098 | 7/1980 | Lowe et al. |
| 4,243,643 | 1/1981 | Mills |
| 4,278,648 | 7/1981 | Walton |
| 4,296,082 | 10/1981 | Lowe et al. |
| 4,299,804 | 11/1981 | Parks et al. |
| 4,332,592 | 6/1982 | Müller .............................. 23/301 R |
| 4,487,750 | 12/1984 | Astley et al. ..................... 423/321 R |

FOREIGN PATENT DOCUMENTS

| | | |
|---|---|---|
| 14692 | 6/1969 | Japan. |
| 1436115 | 5/1976 | United Kingdom. |
| 2078694 | 1/1982 | United Kingdom ............ 423/321 R |

OTHER PUBLICATIONS

W. Ross et al, The Purification of Phosphoric Acid by Crystallization, Industrial and Engineering Chemistry, Oct. 1925, pp. 1081–1083.

C. Y. Shen, Production of Crystalline Pyrophosphoric Acid and its Salts, Industrial & Engineering Chemistry, Process Design and Development, vol. 14, No. 1, pp. 80–85, Jan. 1975.

N. J. J. Hoige et al, Production of Large Crystals by Continuous Ripening In a Stirrer Tank, Journal of Crystal Growth 13/14 May (1972) pp. 483–487.

E. J. Lowe—"Purification of Wet-Process Phosphoric Acid".

R. F. Johnson—"Phosphoric Acid", vol. 1, Part II, published by Marcel Dekker—1968.

Conf. Proceeding in Japan on "Purification of Phosphoric Acid Hemihydrate by Crystallization", Yoshi Aoyama, et al—1976.

Chemical Abstracts, vol. 80, No. 26, Jul. 1, 1974, p. 69, Abstract No. 147419d, Columbus, Ohio US.

Chemical Abstracts, vol. 77, No. 8, Aug. 21, 1972, p. 152, Abstract No. 50841k, Columbus, Ohio, US; J. Skrivanek et al.: "Effect of Temperature Fluctuations ... Orthophosphoric Acid Semihydrate Crystals".

Primary Examiner—David L. Lacey
Attorney, Agent, or Firm—Brumbauch, Graves, Donohue & Raymond

[57] ABSTRACT

The present invention relates to the processing of phosphoric acid by crystallization starting with phosphoric acid and adding relatively large amounts of fine, relatively pure seed crystals to acid which has been cooled to supersaturated conditions. Crystallization thereafter proceeds under conditions which substantially favor growth on the seeds which are added and disfavor secondary nucleation. The present invention particularly describes a seed crystal generator for use in the foregoing process in which relatively high purity phosphoric acid, containing 60% to 66% $P_2O_5$ is cooled to a temperature of at least 5° to 10° C. below zero and thereafter nucleated under agitation for less than ten minutes in a small crystallizing vessel.

5 Claims, 4 Drawing Figures

PROCESS FOR SEED CRYSTAL PREPARATION FOR PHOSPHORIC ACID CRYSTALLIZATION

BACKGROUND OF THE INVENTION

1. Field of the Invention

This invention relates to the production of purified phosphoric acid and, in particular, to the production of concentrated high-purity phosphoric acid.

2. The Prior Art

Most of the high-purity phosphoric acid on the market today is produced by the so-called furnace process, which involves the production of elemental phosphorus in an electric furnace from phosphate rock and coal. The elemental phosphorus is then burned and the resulting phosphorus pentoxide is hydrolyzed to high purity phosphoric acid. This technology is generally costly and very energy intensive. Efforts have been made in the past to develop technology for the production of high-purity phosphoric acid from impure acids, such as wet-process acid. Wet-process acid is produced via the acidulation of phosphate rock with sulfuric acid, and is less expensive to make. Such acid, however, is contaminated with significant concentrations of numerous impurities, such as iron, aluminum, magnesium, sulfate, fluorine and silica. Other impure acids with similar impurities are available "spent acids", that is, acids which, regardless of their original manufacture or purity, e.g., furnace process or wet-process, have been used ("spent") in such industrial applications as metal finishing or in catalyst applications.

While crystallization of the phosphoric acid would normally be considered as a process which would result in a crystallized product of relatively high purity (leaving behind a raffinate containing the rejected impurities), crystallization has not been practiced on an industrial scale for purifying wet-process acid, or for purifying other impure acids. Apparently crystallization has not been commercially accepted because of great difficulty in controlling the rate of crystallization. When the impurities normally associated with wet-process or spent acids are present, the impure acid can withstand very substantial cooling, well into the supersaturation region, before crystallization occurs. Even then spontaneous crystallization can be an extremely slow process. However, once crystals are formed by spontaneous (primary) nucleation, or if seed crystals are added in amounts substantially lower than the amounts used in the method of this invention, the impure acid tends to crystallize relatively rapidly (presumably by secondary nucleation) to a putty-like intractable mass which has a viscosity typically in excess of 50,000 centipoises and which cannot be further processed or separated. This rapid crystallization of phosphoric acid into a putty-like intractable mass is hereinafter referred to as "catastrophic crystallization".

A number of processes have been proposed for removing impurities from phosphoric acid by either extraction or crystallization. For example, U.S. Pat. No. 3,642,439 describes an attempt to provide a process for upgrading the purity of wet-process phosphoric acid. In this process the inventors claim that magnesium can be selectively removed from the wet-process acid via the crystallization of magnesium-containing precipitates. The examples cited in the '439 patent indicate that the efficiency of the process is very limited. The magnesium content before the precipitation step in one of the examples was 0.4%, while after the crystallization and filtration the magnesium content of the purified acid was 0.2%. Thus, the process facilitates only the removal of about 50% of the magnesium content in the feed acid and does practically nothing to remove other impurities contained in the wet-process phosphoric acid.

U.S. Pat. No. 4,299,804 describes another process for the removal of impurities from wet-process phosphoric acid by crystallization. In this case magnesium and aluminum impurities are claimed to be removed in the form of a magnesium-aluminum fluoride. Magnesium removal efficiencies of up to 90% are indicated by the examples; however, aluminum removal effectiveness is generally much poorer and the product still contains the other impurities such as iron, sodium, silica and fluoride. The examples indicate that the efficiency of the aluminum and magnesium removal process varies from sample to sample.

U.S. Pat. No. 4,243,643 refers to another process for the removal of metallic ion impurities from wet-process phosphoric acid. This process also suffers from several distinct disadvantages. It requires the use of a precipitant comprising ions of calcium and fluorine to cause the precipitation of magnesium from the acid, and it requires that the sulfate concentration of the acid exceed 2%. Even then the effectiveness of the process is only of the order of about 50% for magnesium and even lower with respect to other metallic impurities present in the wet-process acid, such as iron, aluminum and sodium.

U.S. Pat. No. 3,890,097 concerns a process for the purification of wet-process phosphoric acid which involves the crystallization from wet-process acid of a $P_2O_5$-containing entity rather than of the impurities. This patent suggests the addition of a quantity of sulfuric acid to wet-process phosphoric acid in an amount sufficient to raise the concentration of sulfuric acid in the solution to a range of from about 10% to 15% by weight. The '097 patent points out that crystallization of wet-process acid is impractical because of the low temperatures required and the high viscosities which occur. The addition of sulfuric acid to the impure phosphoric acid is claimed to lower its viscosity and increase its freezing point. The distinct disadvantage of this process lies in the need for the addition of costly sulfuric acid which is used to modify the physical characteristics, specifically the freezing point and the viscosity, of the phosphoric acid solution from which the purified material is crystallized. As a consequence of this sulfuric acid addition, the sulfuric acid content of the purified phosphoric acid is relatively high, that is, over 1% by weight, and the process is further burdened by a higher water content in the raffinate which carries about 50% of the original $P_2O_5$ values.

British Patent No. 1,436,115 also makes reference to crystallization in purifying wet-process phosphoric acid. In this patent, however, the need to first purify the wet-process acid by solvent extraction is stressed. The disclosure teaches that it is not in fact practicable to produce a purified phosphoric acid by direct crystallization from wet-process phosphoric acid. A similar opinion is expressed in U.S. Pat. No. 3,912,803.

U.S. Pat. Nos. 4,215,098 and 4,296,082 teach that crystallization of phosphoric acid is to be preceded by a purification step and offer heat treatment processes which serve to bring the phosphoric acid to a concentration about 76% $P_2O_5$ and precipitate dissolved impurities from the acid. Only then is the acid diluted and subjected to crystallization.

U.S. Pat. No. 4,083,934 discloses a process for obtaining purified crystallized orthophosphoric acid from superphosphoric acid. The patent does not address the direct purification of wet-process phosphoric acid or the crystallization of phosphoric acid hemihydrate.

Japanese Patent No. 14,692, published in 1969, describes a process for purifying phosphoric acid by crystallization. In this patent the patentees point out that, although crystallization would be a desirable method for purifying phosphoric acid, it has not been employed industrially. Working from the assumption that it is the impurities which adversely affect the rate of crystallization, the Japanese patent describes a pre-crystallization process using oxidants which remove not only organic impurities but also inorganic impurities, such as calcium phosphate, calcium sulfate, chromium, vanadium and manganese, followed by further pre-processing to remove fluoride impurities. It is only after such pre-purification, according to this patent, that practical crystallization can be employed.

In the Proceedings of a Conference of Industrial Crystallization, published in 1976, Aoyama and Toyokura describe a process said to bring about crystallization of phosphoric acid from crude wet-process acid concentrated to about 60% $P_2O_5$. Although the authors claim to have operated a pilot-scale crystallizer for as much as two weeks satisfactorily, nothing is said in the description as to conditions of seeding or control which would preclude catastrophic crystallization. As discussed below in the description of the present invention, it is the problem of catastrophic crystallization which the present invention overcomes by proper control of the seeding conditions. The only discussion of seeding in the Aoyama et al. paper refers to control of the circulation rates through different sections of the crystallizer, which are said to affect the number of seed crystals in the growing bed. However, the details of this control are not described. To the extent it is indicated in their process description it appears that the "seed" crystals are, in fact, products of primary crystallization of the wet-process phosphoric acid. In developing the method of the instant invention the inventors have found that such crystals, when used as the sole source of seed, do not provide controllable results.

An object of this invention is to provide a method for controlling the seeding and other conditions required to avoid catastrophic crystallization while crystallizing phosphoric acid. Another object is to provide a method for purifying phosphoric acid by means of crystallization without the need of solvent extraction techniques. Another object is to provide a process for the manufacture of high-purity phosphoric acid from wet-process phosphoric acid by the selective crystallization of phosphoric acid hemihydrate crystals from the impurities normally associated with the wet-process acid. Still another object of the present invention is to provide a method for purifying wet-process phosphoric acid by crystallization of its $P_2O_5$ entity without the continuous use of reagent additives. A further object of the invention is to provide a method for producing a purified phosphoric acid having a higher $P_2O_5$ concentration than the feed acid from which it is made. A still further object is to provide a process for manufacturing concentrated high purity phosphoric acid from wet-process phosphoric acid by means of selective crystallization of the $P_2O_5$ entity in the wet-process acid which process affords the flexibility of simultaneously manufacturing various purity grades of concentrated phosphoric acid products by means of remelting and recrystallizing said products.

DESCRIPTION OF THE INVENTION

In accordance with the present invention seed crystals for use in the phosphoric acid purification process described in commonly assigned copending U.S. patent application Ser. No. 731,970 of Astley et al. are generated by process which comprises (a) cooling a phosphoric acid liquid containing between about 60% and 66% $P_2O_5$, and less than about 0.1% iron (as $Fe_2O_3$) to a temperature below about $-5°$ C. without nucleation thereof, so as to produce a subcooled solution of phosphoric acid;

(b) continuously supplying said subcooled solution to a crystallization vessel containing crystallized orthophosphoric acid hemihydrate, which vessel is of a small size relative to the rate at which said subcooled acid is supplied thereto, so that said phosphoric acid is retained therein for a period of time not exceeding 10 minutes and in which the phosphoric acid is rapidly agitated, and (c) continuously withdrawing from said crystallization vessel a magma containing orthophosphoric acid hemihydrate crystals, the majority of which are of a length of less than about 0.3 mm.

Preferably, in carrying out the present invention the liquid phosphoric acid is cooled in step (a) to a temperature below about $-10°$ C. and also, preferably, the residence time in the crystallization vessel is less than about 1 minute. Under these conditions seed crystals may be produced which are in the order of 0.08 to 0.13 mm long, and, when used in crystallization of orthophosphoric acid as described hereinafter, will result in yields of orthophosphoric acid hemihydrate which are comparable to thos obtained using fine furnace-grade acid crystal seeds prepared by batch processing.

In practicing the present invenion it has been found important to carry out the initial cooling step under conditions which avoid contamination by even small amounts of orthophosphoric acid hemihydrate. At the purity levels required to generate seed crystals, phosphoric acid solutions can nucleate relatively rapidly by secondary nucleation. For this reason, even small quantities of crystals in the cooling vessel can cause that vessel to rapidly nucleate so that the contents of that vessel are converted to a crystallized mass of orthophosphoric acid hemihydrate. Because of this risk, it is also preferred in the practice of the present invention that the supply of purified orthophosphoric acid to the cooling vessel be kept warm, i.e., at a temperature above that at which crystallization will occur. By so doing, in the event of unanticipated crystallization occurring within the cooling vessel, such crystallization will be confined to that vessel and not travel backwards to the main supply of orthophosphoric acid.

As is apparent from the foregoing description, the present invention also contemplates an apparatus for generating orthophosphoric acid hemihydrate seed crystals which comprises two principal parts, namely means for cooling of the warm acid supply to a temperature in the order of $-9°$ to $-15°$ C., and a crystallization vessel of limited retention time into which the subcooled phosphoric acid is discharged and wherein conversion to seed crystals occurs rapidly, i.e., before there has been an opportunity for any substantial crystal growth. These parts will be described further with reference to the attached drawings, in which FIG. 1 shows a cooling device for receiving warm acid feed and cooling it to a desired temperature;

Figure 4:
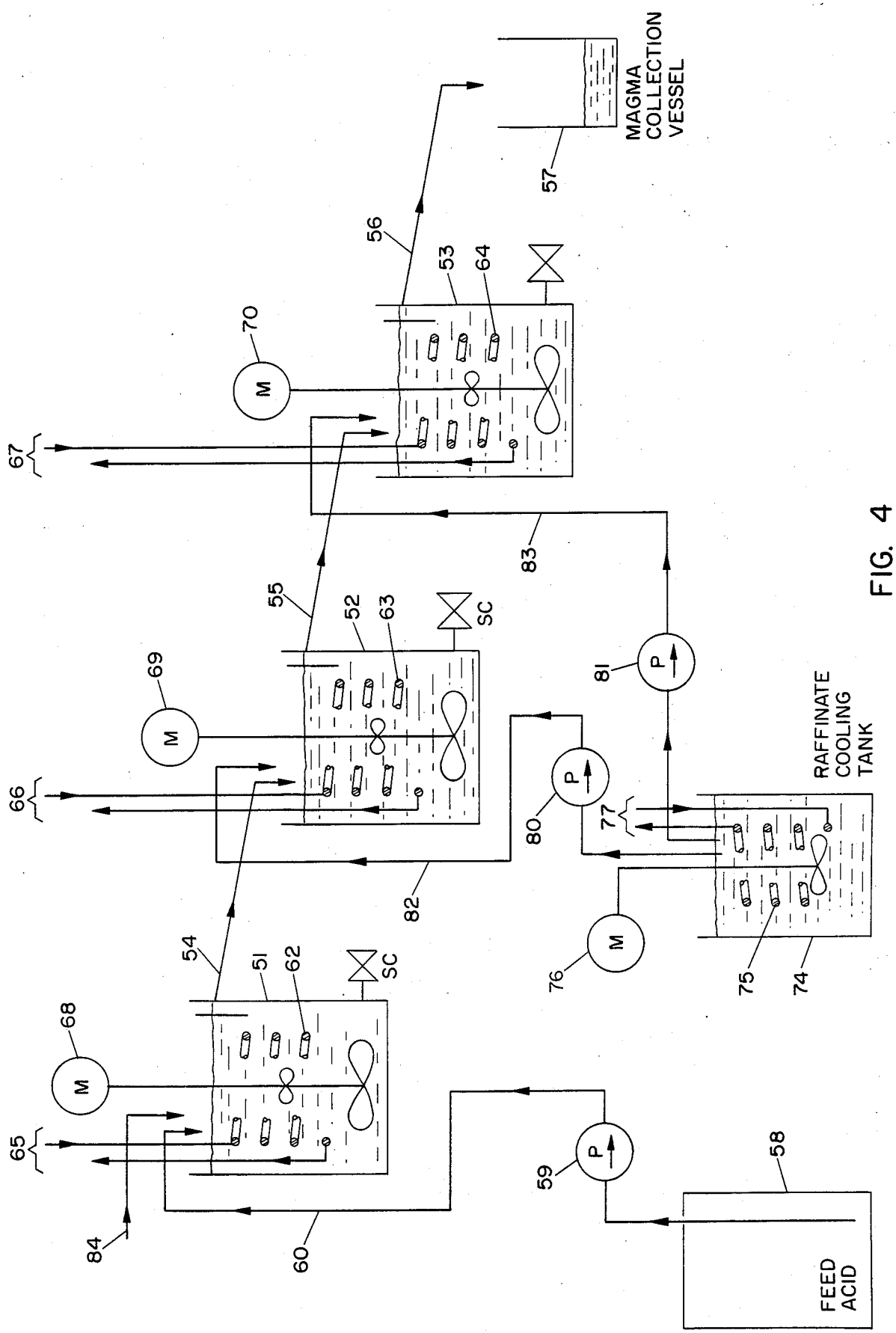

FIG. 4 schematically outlines a crystallization process with which the present invention may be used.

Figure 1:
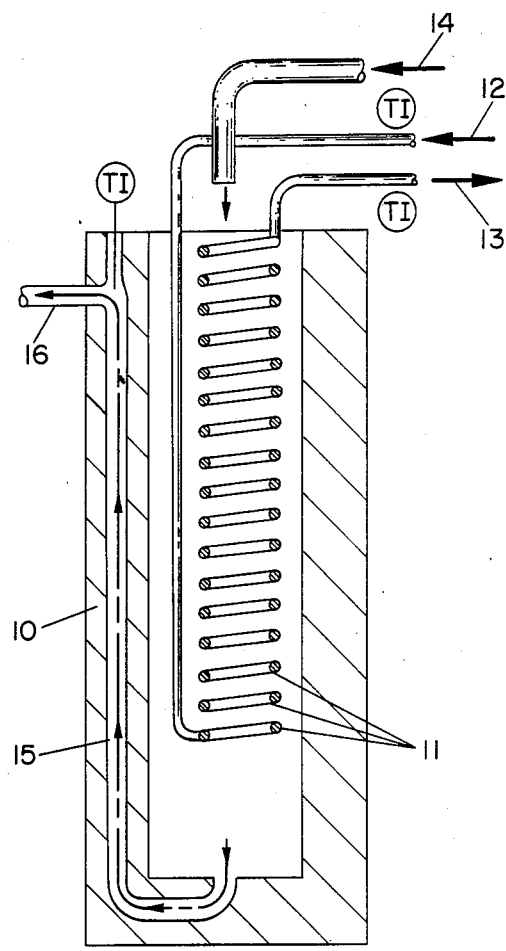

The seed acid cooler shown in FIG. 1 consists of an elongated insulated vessel 10 having a helical coil disposed therein, segments 11 shown. Coolant is supplied to and withdrawn from the helical coil as incicated by the directional arrows 12 and 13. Warm acid is supplied as indicated by directional arrow 14 to the central portion of the cooling vessel, and flows downwardly therethrough. The subcooled acid is withdrawn from the bottom through duct 15, carried upwardly through the wall of the vessel and discharged to the crystallization vessel through discharge port 16. The cooler is designed so that the acid can be received from the top and flow downwardly therethrough under relatively quiescent conditions. The temperatures of the orthophosphoric acid (in and out) and of the coolant in and out are monitored by thermocouples or thermometers, indicated by the symbols "TI".

Typically, acid at a concentration of 62-65% $P_2O_5$ and a temperature between 30° and 60° C. is supplied through supply tube 14 and, as it flows downwardly over the helical cooling coils is cooled to a temperature between $-9°$ and $-13°$ C., depending on the flow rates of the acid. Coolant is supplied to the cooling tubes at a temperature in the order of $-20°$ to $-15°$ C. and withdrawn at a temperature in the order of 0° C.

Figure 2:
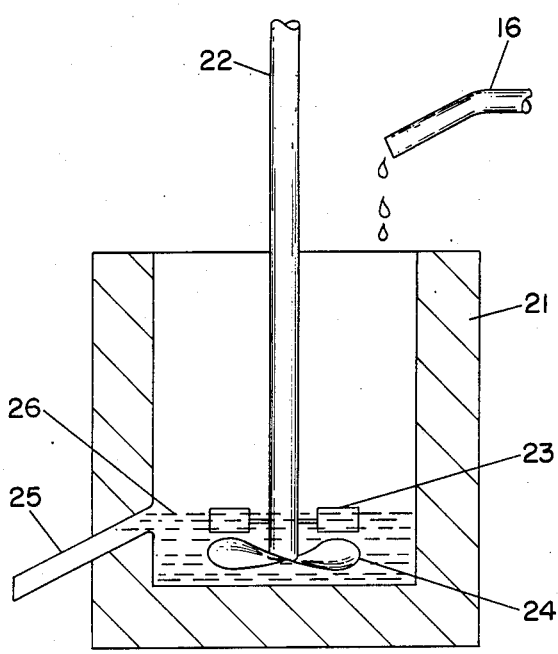
FIG. 2 shows an agitated crystallization vessel sized so as to provide a short residence time.

The overflow from the cooling means exiting through discharge port 16 in the device shown in FIG. 1 is received in an agitated crystallizer shown in FIG. 2. The crystallizer comprises an insulated container 21 having an agitator shaft 22 carrying impeller blades 23 and 24 which provide agitation to the contents of the crystallizer vessel 21. The overflow spout 25 is disposed so that the liquid level 26 corresponds to only a relatively small amount of crystallizing orthophosphoric acid compared to the rate at which it is supplied to the crystallizer. As indicated previously, the residence time within crystallizer 21 should be less than 10 minutes, and preferably less than 1 minute. In a commercial crystallizer for generating seed crystals the residence time may be as short as 10 seconds.

In the design of the crystallizer and cooler it is important to maintain a physical separation between these; otherwise the crystallization will proceed back to the cooler. When such crystallization occurs, it can be reversed by warming the entire cooler up to a temperature sufficient to thoroughly melt the crystallized mass; however, this obviously represents an interruption to be avoided.

In order to obtain the greatest yield of seed crystals it is desirable that the temperature within the crystallizer 21 not be permitted to rise more than it is necessary. Heat is given up as crystallization occurs, thereby raising the magma temperature. The agitator can also add significant energy, which is also converted to heat. Too much agitation relative to the rate of crystallization, therefore, can result in a significant loss in the yield of seed crystals. We prefer therefore to maintain an agitation level which is sufficient to assure that the nucleating seed crystals are thoroughly disagglomerated, but preferably not more than is necessary to accomplish this purpose.

Figure 3:
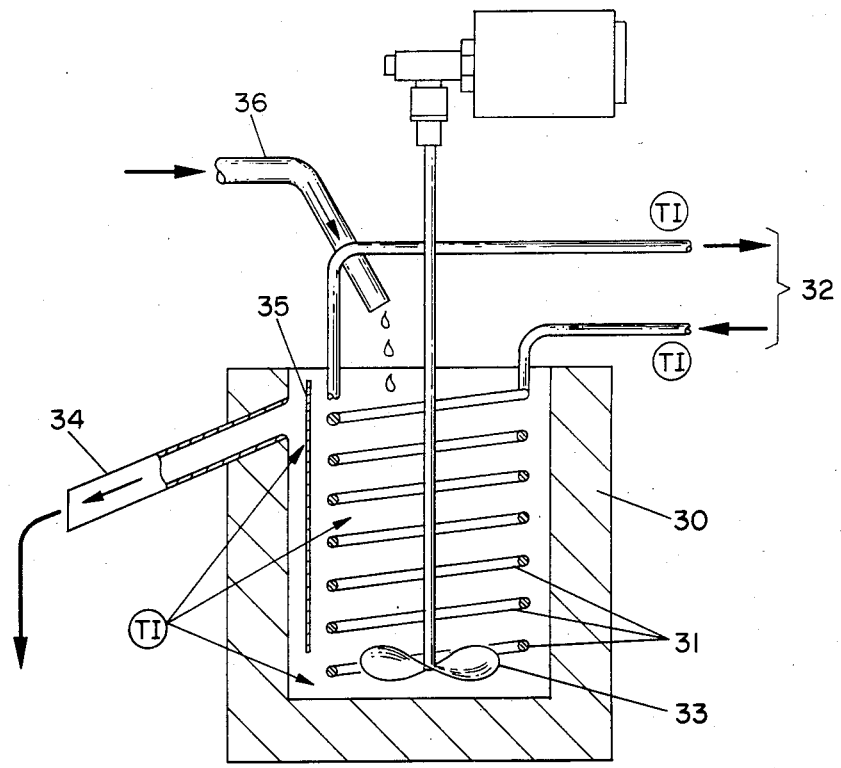
FIG. 3 represents an alternate acid cooler which may be used.

An alternative acid cooler which may be used in the practice of the present invention is shown in FIG. 3. This cooler comprises an insulated vessel 30 which contains a coiled heat transfer element (fragments 31 shown). Coolant enters and leaves the cooling coil 31 as indicated by the supply and discharge arrows 32. The cooling vessel is shown with a motor driven agitator 33 which serves to agitate the phosphoric acid contained therein. Cooled acid is discharged through an overflow spout 34 protected by a baffle plate 35. Temperatures throughout the system are monitored by either thermocouples or thermometers as indicated by the symbols "TI".

In operation, warm feed acid is supplied through feed spout 36, as in the operation of the device shown in FIG. 1, so that if unexpected crystallization occurs within the cooling vessel 30, a crystallized mass will not grow backwards through the acid supplied through fee spout 36.

The cooler indicated in FIG. 3 is generally operated as described with respect to the cooler of FIG. 1. Because agitation is provided, significantly higher heat transfer rates can be achieved; however, because the system is agitating a thermodynamically unstable phosphoric acid at temperatures which may be more than 25° C. below the equilibrium crystallization temperature, there is an increased risk of unwanted crystallization occurring in the device of FIG. 3. This contrasts with the cooling means shown in FIG. 1 which are designed to bring about relatively quiescent contact, in a generally countercurrent fashion, between the cooling phosphoric acid and the coolant carried in a helical coil, segments 11 of the coil being shown in FIG. 1.

In using the process and apparatus described above, the continuous operation described in paragraphs (b) and (c) assumes that there are seed crystals always present in the crystallizating vessel (i.e. crystallizer 21 of FIG. 2) to cause continued crystallization of seed. When this process is first started up, such seed crystals must be provided from an extraneous source. Once started, the process is self-sustaining.

DESCRIPTION OF THE RELATED CRYSTALLIZATION PROCESS

The crystallization process to which the present invention is applicable can treat impure phosphoric acid containing impurities which interfere with crystallization. Such acids can be the ordinary wet-process acid of commerce, typically containing about 54% $P_2O_5$ or the spent acids such as mentioned above. However, the equilibrium freezing point of phosphoric acid hemihydrate from such acids is quite low. For this reason, and to improve the process $P_2O_5$ yields, it is preferred to use an acid containing 58-63% $P_2O_5$.

As used herein, "$P_2O_5$ yield" refers to the percentage of the $P_2O_5$ originally present in the acid fed to the crystallization step which reports in the crystallized phosphoric acid hemihydrate cake. As a practical matter, $P_2O_5$ yields lower than about 20% are considered of little or no interest from a process economics point of view. A preferred phosphoric acid startng material is that prepared in accordance with commonly-assigned U.S. Pat. No. 4,487,750 issued Dec. 11, 1984, to Astley et al. An acid prepared by diluting so-called superphosphoric acid, a commercially available product containing between 69 and 76% $P_2O_5$, to the 58-63% $P_2O_5$ range is also suitable as a starting material.

It is also preferred that the starting material be sustantially free of solid impurities before crystallization. Solids present in the starting acid used in the process of this invention may appear as contaminants in the crystallized product when the latter is separated from the raffinate. For that reason, the solids content of the feed acid should be less than 5%, and preferably less than 3%.

Certain impurities influence the process $P_2O_5$ yields, and can affect the equilibrium freezing point of phosphoric acid hemihydrate. It has been found, for instance, that the fluoride ion content affects the $P_2O_5$ yields in wet-process acids. Since wet-process phosphoric acid varies in its impurity content, it may be desirable for best $P_2O_5$ yields when dealing with wet-process acid to assure a fluoride content of at least 0.5% to 0.7%. Many wet-process acids naturally contain 0.7% to 0.9% fluoride. However some acids may be specially processed in ways which reduce the fluoride content, sometimes to as little as 0.2%. In such cases best results are obtained in practicing the present invention by adding enough hydrofluoric acid to increase the fluoride ion content to the range of 0.5%-0.7% for the first stage of crystallization.

In still higher concentration, the fluoride ion has even more beneficial effects. Again with reference to wet-process acid, fluoride ion has been found to permit crystallization under conditions which reduce the viscosity of the crystallizing magma at a given yield level if present in amounts between 1%-2%. Hence even in typical wet-process acid where the fluoride ion content may be between 0.7 and 1%, the addition of HF can have a beneficial effect on processing. Similar results are found when using fluosilicic acid.

The temperature at which crystallization is carried out is also an important process variable. Crystallization liberates heat, and hence it is normal to provide cooling to maintain the crystallizing magma at a suitable temperature in the crystallization apparatus. The temperature should be maintained sufficiently low to assure a good yield of crystallized product. For instance, if the crystallizer is fed with a wet-process acid concentrate containing 61% $P_2O_5$ (equivalent to 84.25% $H_3PO_4$) and operated at a temperature at which the equilibrium freezing point concentration of $P_2O_5$ is 57% (equivalent to 78.73% $H_3PO_4$) the maximum $P_2O_5$ yield of orthophosphoric acid hemidydrate (91.6% $H_3PO_4$) will be around 47%. If the temperature of the crystallizer is lowered the $P_2O_5$ yield will increase in accordance with the reduced equilibrium concentration of $H_3PO_4$ at such lower temperature. On the other hand, operation at too low a temperature relative to the saturation conditions can increase the degree of supersaturation sufficiently to give rise to secondary nucleation, a phenomenon which we desire to suppress. Therefore, the temperature of the crystallizing magma should be maintained sufficiently high to avoid catastrophic crystallization, that is, to substantially suppress secondary nucleation.

The need for maintaining the temperature at a level sufficient to suppress secondary nucleation leads to a preferred embodiment of the present invention for maximizing $P_2O_5$ yield. In this preferred embodiment crystallization is carried out continuously in two or more stages, with magma withdrawn from each stage used or feed the next succeeding stage. Fresh feed is supplied to the first stage and product magma is withdrawn from the last stage. Each stage operates at a lower temperature than the immediately preceding stage. In this manner, the temperature in each stage can be controlled to suppress secondary nucleation, while on an overall basis the temperature can be lowered in the final stage sufficiently to provide a high $P_2O_5$ yield.

The crystallized $H_3PO_4.\frac{1}{2}H_2O$ obtained by crystallization from wet-process phosphoric acid is substantially purer than the wet-process acid before crystallization. The improvement in purity can be illustrated by the typical data shown in the Table I, below:

TABLE I

| | Product Purity From Wet-Process Acid | |
|---|---|---|
| | Wet-Process | Crystallized Product Cake |
| $P_2O_5$ | 59.6% | 64.6% |
| $SO_4$ | 3.5 | 0.16 |
| $Fe_2O_3$ | 1.7 | 0.22 |
| $Al_2O_3$ | 1.6 | 0.14 |
| F | 0.9 | 0.08 |
| MgO | 0.7 | 0.04 |
| Carbon | 0.2 | 0.04 |

For some applications the first-crop product may be sufficiently pure. However it is still quite discolored and insufficiently purified for many purposes. The first-crop product can be further purified by washing and/or secondary crystallization. Thus, for example, washing of the first-crop product followed by heating will cause it to melt at around 25°-30° C. The melted material can then be cooled, reseeded, and recrystallized. The product of the secondary crystallization can be washed and/or remelted and recrystallized to obtain a tertiary product, if desired. The improvement in purity resulting from such second and third crystallization is illustrated by the data shown in Table II, below:

TABLE II

| | Effect of Recrystallization on Product Purity | | | |
|---|---|---|---|---|
| | Wet-Process Acid | Product Cake of Primary Crystallization | Product Cake of Secondary Crystallization | Product Cake of Tertiary Crystallization |
| $P_2O_5$ | 60.8% | 64.3% | 64.6% | 64.9% |
| $Fe_2O_3$ | 1.89 | 0.3 | 0.06 | 0.01 |
| $Al_2O_3$ | 2.07 | 0.3 | 0.05 | 0.004 |
| MgO | 0.91 | 0.16 | 0.02 | 0.001 |
| $SO_4$ | 4.30 | 0.67 | 0.14 | 0.05 |
| F | .87 | 0.1 | 0.01 | 0.01 |
| Carbon | 0.2 | 0.04 | 0.01 | 0.006 |

The tertiary acid has a purity and color suitable for many applications.

The selection of seed crystals is a third important process variable. Seed crystals used in the present invention should be fine, relatively pure and used in a sufficient quantity that supersaturation will be relieved by crystal growth before a significant amount of secondary nucleation occurs.

In the early tests of the present invention, we found that fine crystals of $H_3PO_4.\frac{1}{2}H_2O$ obtained by adding a small amount of seed to a supersaturated solution of reagent grade phosphoric acid gave excellent results. This provided seeds which were of high purity and small size, i.e., in the order of 0.12 mm in the longest dimension. We have also found that wet-process phosphoric acid which has been crystallized at least twice will yield good seed crystals. On the other hand, we have found that relatively impure crystals at seed crystal addition rates of 8% to 15%, are relatively less effective to produce good results, even if fine in particle size. We have observed, for example, that good results are obtained when the seed crystals of $H_3PO_4 \cdot \frac{1}{2}H_2O$ contain less than 0.1% iron (as $Fe_2O_3$) and have a crystal length of less than 0.3 millimeter. Also, the acid from which the seeds are made should preferably have a $P_2O_5$ concentration of between 58% and 63%.

An important aspect of the process to which the present invention is applicable relates to the amount of seed added. That amount should be sufficient to preclude massive or catastrophic crystallization which, as already mentioned, results in a viscous mass in which the phosphoric acid hemihydrate crystals cannot be separated from the mother liquor. As explained above, we believe that the occurrence of such catastrophic crystallization is the result of secondary nucleation which is not adequately suppressed.

In continuous processing, seed may be added periodically or continuously; however, if it is added periodically, the frequency should be sufficient to maintain crystal growth at a rate which will prevent catastrophic crystallization. When a continuous crystallization mode is employed, crystal production may not be self sustaining without seed crystal addition. We have observed that in such continuous operation if seeding is suspended, crystallization will either cease, or catastrophic crystallization will ensue.

The amount of seed required to afford controlled crystal growth is dependent upon the amount of supersaturation of the solution being recrystallized, the size of the seed crystals and seed crystal purity. In a typical case, a wet-process phosphoric acid of about 60% $P_2O_5$ is cooled to between 0° and 5° C. in the crystallizer. In such a system we use at least 2% seed crystals based on the weight of crude acid, and typically we provide about 5% fine, high-purity seed crystals. The amount of time allowed for crystal growth also affects the amount of seed required. In a typical batch process where 5% seed is added, a near equilibrium product is obtained in about 6 hours. If half that amount of seed is used, the crystallization time required to obtain about the same yield will approximately double.

To illustrate the range of variables which affect the $P_2O_5$ yield and the degree of difficulty associated with the separation of the crystallized product by centrifugation a series of tests were made using seed crystals of varying origins and in various amounts, as shown in Table III, below. In this series of tests we used simple batch crystallization in laboratory-scale equipment having a stirrer rotating at 100 rpm and a total crystallization time of about 6 hours at the stated temperatures. The starting material was concentrated wet-process phosphoric acid at about 60% $P_2O_5$.

TABLE III

Effect of Seed Addition

| Test No. | Temperature | % Seed | Seed Origin | $P_2O_5$ Yield | Comments |
|---|---|---|---|---|---|
|  | 4° C. | 5 | Furnace Acid | 44% | Easy separation |
| 2 | 4° C. | 3 | Furnace Acid | 33% | Easy separation |
| 3 | 4° C. | 2 | Furnace Acid | 30% | Easy separation |
| 4 | 4° C. | 1 | Furnace Acid | 16% | Viscous, difficult separation |
| 5 | 4° C. | 5 | Product from Test 1 | 13% | Viscous, difficult separation |
| 6 | 4° C. | 1 | Product from Test 1 | 3% | Viscous, difficult separation |

In the foregoing table the furnace acid seed crystals were of a size in the order of 0.1 mm long. The crystals used for seeding in Tests 5 and 6 were those obtained in Test 1. These crystals were longer than 0.3 mm.

As can be seen from the above data the best results were obtained when the wet-process acid was seeded with furnace acid seeds in amounts substantially higher than 1% by weight of wet-process acid.

In carrying out crystallization in stages, as suggested above, the viscosity of the magma can become quite high as crystallization progresses, particularly at lower temperatures, even in the absence of catastrophic crystallization or secondary nucleation. Magmas having excessively high viscosities, for example over 30,000 centipoises, become very difficult to process. Larger amounts of energy are required to maintain agitation, pumping costs increase, and separation of the product from the magma derived from the last stage by filtration or centrifuging becomes more difficult. It is desirable therefore to maintain viscosity below about 30,000 centipoises and preferably below 10,000 centipoises. In accordance with the present invention, it has been discovered by Astley et al. (commonly assigned copending U.S. patent application Ser. No. 731,970) that raffinate obtained from the magma derived from the final stage can be recycled to the crystallizers to reduce the viscosity therein. This expedient is particularly desirable in staged separations.

The present invention was tested using the apparatus illustrated in FIG. 4. The apparatus consisted of three successive crystallizers 51, 52 and 53 of approximately 5 gallons each. Each crystallizer was provided with an overflow spout (respectively 54, 55 and 56) with the final product overflow from crystallizer 53 entering a magma collection vessel 57. The magma in vessel 57, consisting of a mixture of crystallized phosphoric acid and raffinate, was separated into its components by a centrifuge in a separate step (not shown). Drum 58 of phosphoric acid which had previously been concentrated to approximately 60% $P_2O_5$ was used to supply feed which was pumped by feed pump 59 through feed supply line 60 into crystallizer 51.

Each crystallizer was fitted with a spiral stainless steel cooling coil (indicated by fragments 62, 63, and 64) which maintains the temperature of the respective crystallizing containers. Each of the cooling coils was fitted with coolant supply and return lines 65, 66 and 67 connected to a common coolant supply (not shown). Each crystallizer was also fitted with an agitator driven by an electric motor (68, 69 and 70).

In the operation of the staged crystallizer shown in the drawing it was found that the viscosity in the second and third stages had to be controlled. Excessive viscosity was noted when the current required to operate the stirrers 69 and 70 in these two stages became excessive. To avoid excessive viscosities, provision was made to recycle raffinate obtained from the centrifugation of the magma accumulated in vessel 57 from one or more preceding centrifugations. Such raffinate was stored in a raffinate cooling tank 74 provided with a cooling coil (fragments 75 shown) and a stirrer driven by electric motor 76. The cooling coil 25 was provided with coolant from the same common cooling source previously referred to through coolant supply and return lines 77. Raffinate was pumped to each of the second and third stages by raffinate recycle pumps 80 and 81 through raffinate supply lines 82 and 83.

Seed crystals were supplied to stage 51 through feed crystal supply line 84. In the experiments described hereinbelow the seed crystals were added batchwise about every thirty minutes.

EXAMPLE 1

Seed crystals were prepared using the apparatus illustrated in FIGS. 2 and 3. In this example furnacegrade acid at a concentration of 61.6% $P_2O_5$ was cooled to a temperature of $-10°$ C. The cold overflow acid was received by an agitated crystallizer as shown in FIG. 2 having adjustable overflow positions so that residence time could be varied between 45 seconds and 30 minutes. The temperature of the nucleated seed crystal magma leaving the crystallizer was about 18° C. Seed slurries thus prepared were prepared and stored for evaluation.

The various samples of seed crystals were tested using a single stage of the crystallization process described in FIG. 4. The performance of each different sample of seed crystals was tested by using the crystals to seed a six-hour batch-type crystallization of wet-process phosphoric acid Test batches of 2.25 gallons of phosphoric acid containing about 61% $P_2O_5$, about 1.9% $Fe_2O_3$ and about 0.9% F. were supplied to the crystallizer along with 2.25 gallons of raffinate, and cooled to a temperature of about 0° C. Each test batch was seeded with 220 gm of a test seed slurry prepared using the process and apparatus described above. After 6 hours, the solids content of the crystallized magma was measured. The results are shown in Table IV.

TABLE IV
SIZES AND PERFORMANCES OF SEEDS PREPARED IN CONTINUOUS REACTORS

| Preparation of Seed Crystals | | Crystallization of Wet-Process Phosphoric Acid | |
|---|---|---|---|
| Seed Reactor Residence Time (min) | Seed Crystal Length (mm) | Net $P_2O_5$ Yield (%) | Product Crystal Size (mm) |
| 0.75 | 0.13 | 66.3 | 0.15 × 0.4 |
| 1.80 | 0.15 | 59.4 | — |
| 3.0 | 0.18 | 54.6 | 0.28 × 0.14 |
| 13.0 | 0.38 | 39.8 | — |
| 32.0 | 0.50 | 24.8 | 0.5 × 1.4 |

We claim:

1. A method for continuously preparing ultra fine crystals of phosphoric acid hemihydrate suitable for use as seed crystals in a crystallization process, which method comprises;
    (a) cooling a phosphoric acid liquid containing between 60% and 66% $P_2O_5$, and less than 0.1% iron (as $Fe_2O_3$) to a temperature below $-5°$ C. without nucleation thereof, so as to produce a subcooled solution of phosphoric acid;
    (b) continuously supplying said subcooled solution to a crystallization vessel containing crystallized orthophosphoric acid hemihydrate, which vessel is of a small size relative to the rate at which said subcooled acid is supplied thereto, so that said phosphoric acid is retained therein for a period of time not to exceed 10 minutes and in which the phosphoric acid is rapidly agitated, whereby ultra fine crystals of phosphoric acid hemihydrate are obtained, the majority of which are of a length of less than 0.3 mm and
    (c) continuously withdrawing from said crystallization vessel a magma containing said ultra fine orthophosphoric acid hemihydrate crystals.

2. A method according to claim 1 wherein the residence time within the crystallizer vessel is less than 1 minutes.

3. A method for preparing ultra fine crystals of phosphoric acid hemihydrate suitable for use as seed crystals in a crystallization process, which method comprises;
    (a) cooling a phosphoric acid liquid containing between 60% and 66% $P_2O_5$ to a temperature below $-5°$ C. in a cooling means without nucleation thereof, thereby producing a subcooled solution of phosphoric acid;
    (b) subjecting said subcooled solution of phosphoric acid while under agitation to sudden crystallization for a period of time not exceeding 10 minutes, thereby producing a magma of ultra fine orthophosphoric acid hemihydrate crystals the majority of which are of a length of less than about 0.3 mm.

4. A method for preparing ultra fine crystals of phosphoric acid hemihydrate suitable for use as seed crystals in a crystallization process, which method comprises;
    (a) cooling a phosphoric acid liquid containing between 60% and 66% $P_2O_5$ to a temperature below $-5°$ C. in a cooling means without nucleation thereof, thereby producing a subcooled solution of phosphoric acid;
    (b) subjecting said subcooled solution of phosphoric acid to sudden bath crystallization by adding a small quantity of orthophosphoric acid hemihydrate crystals while under intense agitation for at least 5 seconds and less than 10 minutes, thereby producing a magma of ultra fine orthophosphoric acid hemihydrate crystals.

5. The method according to claim 1, 3 or 4 wherein said liquid phosphoric acid is cooled in step (a) to a temperature below $-10°$ C.

* * * * *